United States Patent
Nickel et al.

(10) Patent No.: US 8,221,507 B2
(45) Date of Patent: Jul. 17, 2012

(54) REMOVING THE SILICONE COATING FROM COATED FABRICS AND AIRBAGS

(75) Inventors: Friedhelm Nickel, Tübingen (DE); Douglas Malcolm Hilton, Manchester (GB)

(73) Assignee: CHT R. Beitlich GmbH (DE)

( * ) Notice: Subject to any disclaimer, the term of this patent is extended or adjusted under 35 U.S.C. 154(b) by 411 days.

(21) Appl. No.: 11/988,826

(22) PCT Filed: Jun. 26, 2006

(86) PCT No.: PCT/EP2006/063528
§ 371 (c)(1),
(2), (4) Date: Mar. 5, 2008

(87) PCT Pub. No.: WO2007/009856
PCT Pub. Date: Jan. 25, 2007

(65) Prior Publication Data
US 2009/0126122 A1  May 21, 2009

(30) Foreign Application Priority Data
Jul. 15, 2005 (DE) .......................... 10 2005 033 063

(51) Int. Cl.
*C11D 3/00* (2006.01)
*B08B 7/00* (2006.01)

(52) U.S. Cl. ........ 8/137; 8/137.5; 8/138; 8/139; 134/40; 510/200; 510/244

(58) Field of Classification Search ............... 8/137–139; 510/347–504, 200, 244; 134/40
See application file for complete search history.

(56) References Cited

U.S. PATENT DOCUMENTS

| | | | | |
|---|---|---|---|---|
| 4,654,041 A | * | 3/1987 | Nickel | 8/137 |
| 5,916,687 A | * | 6/1999 | Takanashi et al. | 428/447 |
| 6,177,399 B1 | * | 1/2001 | Mei et al. | 510/466 |
| 2004/0077236 A1 | * | 4/2004 | Ishii et al. | 442/76 |

FOREIGN PATENT DOCUMENTS

| | | |
|---|---|---|
| DE | 2901698 | 9/1979 |
| DE | 3515077 C1 | 6/1986 |
| EP | 0950684 B1 | 4/1999 |
| JP | 55076160 | 6/1980 |
| JP | 2001-180413 | * 12/1999 |
| JP | 200180413 | * 7/2001 |
| JP | 2001180413 | 7/2001 |

OTHER PUBLICATIONS

Database WPI Week 198030; Derwent Publications Ltd., London, GB; AN 1980-52342C; pp. 1-11.
Walter Noll; Chemie and Technologie der Silikone; Verlag Chemie GMbH, 2nd Edition; 1968; p. 512.
Patent Abstracts of Japan; Bd. 2000, Nr.24, May 11, 2001.

* cited by examiner

*Primary Examiner* — Lorna M Douyon
*Assistant Examiner* — Tri V Nguyen
(74) *Attorney, Agent, or Firm* — Clements Bernard PLLC; Gregory N. Clements

(57) ABSTRACT

The invention relates to a process for removing silicones present on fibers, yarns or textile sheet materials (substrates) wherein an aqueous preparation is allowed to act on the substrates, and then the thus treated substrates are rinsed to remove the residual silicone, characterized in that said preparation contains from 0.5 to 10% by weight of surface-active quaternary ammonium compounds and from 0.5 to 5% by weight of alkali hydroxide, respectively based on the aqueous preparation. The process is suitable, in particular, for the recovery and recycling of fibrous material and silicones from airbags or coated fabric scraps from the ready-making of airbags.

11 Claims, No Drawings

REMOVING THE SILICONE COATING FROM COATED FABRICS AND AIRBAGS

BACKGROUND OF THE INVENTION

1) Field of the Invention

The invention relates to a process for removing silicones present on fibers, yarns or textile sheet materials, especially for the recovery and recycling of fibrous material from airbag production.

2) Description of Prior Art

To a higher and higher extent, silicones are employed for the surface treatment of fibers, yarns or textile sheet materials. In particular, silicones are used for the hydrophobization of textiles. The fabric treated with silicones frequently obtains a soft and smooth touch. When yarns are treated with silicones, especially silicone oils, the fiber/metal friction is reduced.

The liquid to paste-like chain-shaped dialkylpolysiloxanes, especially dimethylpolysiloxanes, the methylhydrogenpolysiloxanes that are fixable on the fiber and silicone resins containing tri- or tetraflnctional silicon moieties and being condensable onto the fiber are used as the silicones.

The fact that organosilicones are difficult to remove from the fiber so that the silicone impregnation is fast to washing and cleaning is of particular advantage. However, this desired property can be very disturbing when it becomes necessary in practice to strip the silicone impregnation from defective lots: In "Chemie und Technologie der Silikone" by Walter Noll, Verlag Chemie GmbH, 2nd Edition, 1968, p. 512, it is stated that the silicone film is to be decomposed in a hot and acidic environment, wherein a combination with solvent-containing detergents can be contemplated. It is not surprising that such an aggressive procedure can often result in damage to the fibers.

EP 0950684 B1 describes a process for the reprocessing of polyamide material containing silicone resin using a 5 to 50% by weight alkali hydroxide solution. From DE 35 15 077 C1, it is known to remove a silicone impregnation from textile materials by treating the textile materials with aqueous formulations containing detergent substances, oxalic acid and sodium carbonate. Although this procedure is slightly more gentle, it does not allow the silicones to be removed completely from the textile surfaces and fails especially when the silicones are cross-linked into products having a high molecular weight.

From this document, there is also already known a process for removing silicones present on fibers, yarns or textile sheet materials, characterized in that aqueous preparations containing surface-active equilibration catalysts for organosiloxanes that are capable of cleaving and reforming siloxane bonds in amounts of from 0.2 to 5% by weight, based on the aqueous preparation, are allowed to act on the substrate, optionally at elevated temperatures. With this process, it is possible to remove silicone impregnations from the surface of fibers, yarns or textile sheet materials under as mild as possible conditions. The thus treated textile materials can then again have a wetting behavior like they had before the impregnation in order to optionally subject them to further treatments, for example, to provide a new color or shade.

However, the process described in DE 35 15 077 C1 reaches its limits where thick layers of highly cross-linked silicone of high density must be removed. Especially in the production/ready-making of airbags for the vehicle industry, textile materials coated in this way are used because their highly cross-linked and adhesive-free coating is required for retaining the explosion gases occurring when the airbag is triggered and for enabling inflation of the airbag. For the fabric coating, especially for the airbag finishing, liquid silicone rubbers which are two-component systems and consist of a methylhydrogensiloxane as a cross-linking agent and a silicone polymer containing vinyl groups that vulcanize under the catalysis of Pt(0) complexes by means of a hydrosilylation reaction are usually employed. The two components are mixed and applied to the fabric in a thin layer by a suitable coating process, for example, with a knife-over-roll. The vulcanization of the silicone rubber is effected at temperatures of from 130 to 170° C., and annealing is often performed afterwards at 200° C.

For very smooth and dense fabrics of polyamide or other synthetic fibers, the adhesion of the coating composition is not optimal, so that priming with suitable organosilanes for improving the adhesion is often necessary.

The large supply with airbags, which has become ubiquitous in the meantimne, and the growing production of waste from airbag production/fabric scraps from airbag ready-making as well as used airbags from the junking of motor vehicles result in a need for a process for the processing and recycling of the raw materials employed, in this case the fibrous material and silicones employed. For example, in Great Britain alone, 4,000 tons of silicone-coated fabrics derived from airbags or airbag production are currently obtained per year, for which a useful recycling process is not available in the prior art.

SUMMARY OF THE INVENTION

Surprisingly, it has now been found that a modification of the process described in DE 35 15 077 C1 can achieve this object. Accordingly, the object of the invention is achieved by a process for removing silicones present on fibers, yarns or textile sheet materials (substrates) wherein an aqueous preparation is allowed to act on the substrates, and then the thus treated substrates are rinsed to remove the residual silicone, characterized in that said preparation contains from 0.5 to 10% by weight of surface-active quaternary ammonium compounds and from 0.5 to 5% by weight of alkali hydroxide, respectively based on the aqueous preparation.

In the broadest sense, the present invention is a process for removing silicones present on fibers, yarns or textile sheet materials (substrates) wherein an aqueous preparation is allowed to act on the substrates, and then the thus treated substrates are rinsed to remove the residual silicone, characterized in that said preparation contains from 0.5 to 10% by weight of surface-active quaternary ammonium compounds and from 0.5 to 5% by weight of alkali hydroxide, respectively based on the aqueous preparation.

DESCRIPTION OF THE INVENTION

The present invention uses surface active quaternary ammonium compounds and a higher amount of alkali hydroxide, in an aqueous preparation, neither of which is disclosed in DE 35 15 077.

While the aqueous preparation acts on the substrates, the vulcanized silicone is equilibrated to enable separation of the silicone from the fibrous material and separate processing thereof. Unlike in the Examples disclosed in DE 35 15 077 C1 in which the presence of 0.3% by weight of 30% aqueous sodium hydroxide in the preparation employed is disclosed at most, it is essential to the present invention that the preparation contains at least 0.5% by weight of alkali hydroxide, based on the aqueous preparation.

The process can be performed in a particularly advantageous manner if the aqueous preparation contains from 1.3 to 3.0% by weight, especially from 1.5 to 2.5% by weight, of surface-active quaternary ammonium compounds and/or from 0.8 to 3.5% by weight, especially from 1.5 to 2.5% by weight, of alkali hydroxide. In the narrow concentration ranges stated, the silicone coating can be removed in a particularly efficient and cost-saving way and put to recycling. In particular, it is to be pointed out that the narrow preferred concentration range for surface-active quaternary ammonium compounds is clearly above the concretely disclosed concentrations of DE 35 15 077 C1, and the efficiency of separation of the substrates from the residual silicones as achieved with the present process is therefore completely unexpected and surprising.

The quaternary ammonium compounds to be used as equilibration catalysts in the process according to the invention are also specifically selected inasmuch as they must have surface-active properties. In particular, they are to reduce the surface tension of the water to a value of $\leq 50$ mN·m$^{-1}$ in an at most 1% solution.

More preferably, said surface-active quaternary ammonium compounds include stearyldimethylbenzylammonium hydroxide, distearyldimethylammonium hydroxide, tricaprylmethylammonium hydroxide, didecyldimethylammonium chloride, cocoalkyldimethylpentylammonium chloride and/or cocoalkyltrimethylammonium chloride. It is particularly advantageous to perform the process according to the invention in such a way that the aqueous preparation is allowed to act on the substrates at a temperature that is increased with respect to room temperature, especially at temperatures of above 95° C., more particularly at 100° C. at least, and/or the time of action is set within a range of from 30 to 240 minutes, more particularly from 90 to 150 minutes.

In this way, the equilibration of the vulcanized silicone is achieved in a particularly efficient way, so that it can be separated from the fibrous material with the aqueous preparation, and both can be processed separately.

Preferably, aqueous preparations are used that further contain cosolvents, wetting agents and/or dispersing agents and optionally also detergent substances.

The solubility of the surface-active equilibration catalysts decreases as the number of carbons in the alkyl, aryl or alkylaryl residues increases. In order to be able to solve or at least distribute in a finely dispersed way the catalysts in the aqueous preparation, it may therefore be required to add cosolvents or dispersing agents to the aqueous preparation.

Examples of such cosolvents include lower, water-soluble, alcohols or glycols, especially 1,2-propanediol or butyl diglycol. As the wetting or dispersing agent, water-soluble addition products of ethylene oxide to fatty alcohols, to oxo alcohols having from 10 to 18 carbon atoms or to polyoxyalkylene-modified siloxanes are suitable.

Sometimes however, the detergent substance mostly contained in the preparations or the wetting agent contained in the preparation is already sufficient to disperse the catalysts in the aqueous preparation. It is also possible to increase the content of detergent substance or wetting agent in order to obtain the desired solubilization or fine dispersion.

However, a particular advantage of the process according to the invention is the fact that it can be performed in a completely emulsifier-less manner, i.e., substantially free from added emulsifiers. This is desirable also because a quick phase separation facilitates the processing of the fibrous materials separated from the silicone coating as well as of the silicone in the aqueous solution.

The process according to the invention is particularly suitable for the removal of cross-linked, especially highly cross-linked, silicone polymers, more particularly of vulcanized liquid silicone rubber polymers.

An optimum recyclability of the recovered raw materials is obtained if the preparation is separated from the substrate after the time of action and both are processed separately. Especially substrates which contain polyamide fibers, more particularly those which essentially consist of polyamide fibers, can be separated from highly cross-linked silicone polymers for the first time with the process according to the invention and are thus available for recycling.

Therefore, in a particular embodiment, the invention relates to a process according to the invention which is characterized in that the substrates are derived from airbags or coated fabric scraps from the ready-making of airbags.

Thus, the process preferably serves for the recovery and recycling of fibrous material, especially polyamide fibers and silicones.

To remove the silicones from the textile materials, the textile materials are added to the aqueous preparation and agitated therein at temperatures of 20° C. or higher. The upper limit of the temperature is defined essentially by the temperature resistance of the textile material. The process can be performed in washing machines as are usual in the textile industry, for example, so-called rotary washing machines.

After the aqueous preparation has acted on the substrate and been pumped off, the textile material must be rinsed thoroughly to completely remove the preparation and the residual silicone dispersed therein.

In the following Examples, the process according to the invention is further illustrated, and a comparison with a prior art process is performed.

PROCESS EXAMPLES

Example 1 (According to the Invention)

In a pressure-resistant rotary washing machine, for example, "Universal HT" as supplied by the company Flainox, 100 kg of silicone-coated polyamide fabric from the ready-making of airbags with a silicone coating density of 55 g/m$^2$ was treated with 900 kg of a preparation of 1.0% didecyldimethylammonium chloride, 1.0% distearyldimethylammonium chloride, 2.0% 1,2-propanediol and 2.0% sodium hydroxide at 135° C. for 120 minutes.

After this time, the contents of the drum were cooled down to about 40° C., and the preparation was drained into an oil separator.

The polyamide fabric with the silicone coating removed was rinsed once with 900 kg of cold water and once again with 900 kg of cold water with 5.0% acetic acid added at 50° C., then spin-dried and further dried on a belt drier.

The aqueous preparation was freed from the medium viscosity silicone oil in the oil separator and utilized for the next stripping process.

The polyamide fabric with the silicone removed was molten and pelletized and reused in scrap recycling. The separated silicone oil was purified by a silicone producer and included as a raw material in various syntheses or compounds.

The weighing of the separated silicone oil showed that 99.5% of the silicone coating applied could be removed from the polyamide fabric by the process according to the invention.

Comparative Example 2 (Not According to the Invention)

In a pressure-resistant rotary washing machine, for example, "Universal HT" as supplied by the company Flainox, 100 kg of silicone-coated polyamide fabric from the ready-making of airbags with a silicone coating density of 55 g/m$^2$ was treated with 900 kg of a preparation of 2.0% 1,2-propanediol and 2.0% sodium hydroxide at 135° C. for 120 minutes.

After this time, the contents of the drum were cooled down to about 40° C., and the preparation was drained into an oil separator.

The treated polyamide fabric was rinsed once with 900 kg of cold water and once again with 900 kg of cold water with 5.0% acetic acid added at 50° C., then spin-dried and further dried on a belt drier.

In the oil separator, the aqueous preparation showed only small amounts of the removed, but not equilibrated silicone coating.

The treated polyamide fabric still bore the substantially intact silicone coating on large areas thereof, so that it was not possible to recycle the individual valuable materials.

Comparative Example 3 According to DE 35 15 077 C1 (Not According to the Invention)

In a pressure-resistant rotary washing machine, for example, "Universal HT" as supplied by the company Flainox, 100 kg of silicone-coated polyamide fabric from the ready-making of airbags with a silicone coating density of 55 g/m$^2$ was treated with 900 kg of a preparation of 1.0% cocoalkyldimethylbenzylammonium chloride, 0.2% cocoalkyltrimethylammonium chloride, 0.2% tricaprylmethylammonium chloride, 0.2% distearyldimethylammonium chloride, 0.6% non-ionogenic detergent based on i-tridecanol polyglycol ether and PEO sorbitan monolaurate and 0.2% sodium hydroxide at 95° C. for 120 minutes.

After this time, the contents of the drum were cooled down to about 40° C., and the preparation was drained into an oil separator.

The treated polyamide fabric was rinsed once with 900 kg of cold water and once again with 900 kg of cold water with 5.0% acetic acid added at 50° C., then spin-dried and further dried on a belt drier. In the oil separator, the aqueous preparation showed only small amounts of the removed, but not equilibrated silicone coating.

The treated polyamide fabric still bore the substantially intact silicone coating, so that it was not possible to recycle the individual valuable materials.

The invention claimed is:

1. A process for removing vulcanized liquid silicone rubber polymers present on substrates wherein an aqueous preparation is allowed to act on the substrates, and then the thus treated substrates are rinsed to remove the residual vulcanized liquid silicone rubber polymer, characterized in that said preparation contains from 0.5 to 10% by weight of surface-active quaternary ammonium compounds and from 0.5 to 5% by weight of alkali hydroxide, respectively based on the aqueous preparation, characterized in that said aqueous preparation is free from emulsifiers, and the substrates are derived from airbags or coated fabric scraps from the ready-making of airbags.

2. The process according to claim 1, characterized in that said aqueous preparation contains from 1.3 to 3.0% by weight, of surface-active quaternary ammonium compounds.

3. The process according to claim 1, characterized in that said aqueous preparation contains from 0.8 to 3.5% by weight, of alkali hydroxide.

4. The process according to claim 1, characterized in that said aqueous preparation is allowed to act on the substrates at a temperature that is increased with respect to room temperature and the time of action is set within a range of from 30 to 240 minutes.

5. The process according to claim 1, characterized in that said aqueous preparation further contains cosolvents, wetting agents and/or dispersing agents.

6. The process according to claim 1, characterized in that said aqueous preparation is separated from the substrate after a time of action and both are processed separately.

7. The process according to claim 1, characterized in that said substrates contain polyamide fibers.

8. The process according to claim 1, for the recovery and recycling of fibers.

9. The process according to claim 4, wherein the temperature is above 95° C.

10. The process according to claim 4, wherein the temperature is at least 100° C.

11. The process according to claim 4, wherein the time of action is set within a range of from 90 to 150 minutes.

* * * * *